United States Patent
Domke et al.

(10) Patent No.: US 10,950,080 B2
(45) Date of Patent: Mar. 16, 2021

(54) METHODS AND DEVICE FOR CHECKING VALUE DOCUMENTS

(71) Applicant: GIESECKE+DEVRIENT CURRENCY TECHNOLOGY GMBH, Munich (DE)

(72) Inventors: Jan Domke, Vaterstetten (DE); Hans-Uwe Moosler, Munich (DE); Klaus Thierauf, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 300 days.

(21) Appl. No.: 16/073,402

(22) PCT Filed: Jan. 25, 2017

(86) PCT No.: PCT/EP2017/000088
§ 371 (c)(1),
(2) Date: Jul. 27, 2018

(87) PCT Pub. No.: WO2017/129364
PCT Pub. Date: Aug. 3, 2017

(65) Prior Publication Data
US 2019/0035195 A1   Jan. 31, 2019

(30) Foreign Application Priority Data

Jan. 27, 2016   (DE) .................... 10 2016 000 837.7

(51) Int. Cl.
*G01N 29/44*       (2006.01)
*G07D 7/183*       (2016.01)
*G07D 7/08*        (2006.01)

(52) U.S. Cl.
CPC ......... *G07D 7/183* (2017.05); *G01N 29/4427* (2013.01); *G01N 29/4445* (2013.01);
(Continued)

(58) Field of Classification Search
CPC ...... G07D 7/183; G07D 7/08; G07D 2207/00; G01N 29/4427; G01N 29/4445;
(Continued)

(56) References Cited

U.S. PATENT DOCUMENTS 6,595,060 B2   7/2003   Wunderer et al.
8,510,062 B2   8/2013   Domke et al.
(Continued)

FOREIGN PATENT DOCUMENTS

DE   10029442 A1    1/2002
DE   102011121913 A1   6/2013
(Continued)

OTHER PUBLICATIONS

German Search Report from DE Application No. DE 10 2016 000 837.7, dated Aug. 26, 2016.
(Continued)

*Primary Examiner* — Xin Y Zhong
(74) *Attorney, Agent, or Firm* — Workman Nydegger

(57) ABSTRACT

A method for examining a value document includes emitting ultrasonic pulses onto several locations on the value document. An echo pulse arises by reflection of at least a portion of a respective ultrasonic pulse at the value document. The echo pulses are received while forming echo values, and from the echo values at least a characteristic value is established as to the wrinkledness of the value document. As apparatus is provided for carrying out the method.

19 Claims, 5 Drawing Sheets

(52) U.S. Cl.
CPC ......... *G07D 7/08* (2013.01); *G01N 2291/011* (2013.01); *G01N 2291/0237* (2013.01); *G01N 2291/263* (2013.01); *G07D 2207/00* (2013.01)

(58) Field of Classification Search
CPC ..... G01N 2291/011; G01N 2291/0237; G01N 2291/263
See application file for complete search history.

(56) References Cited

U.S. PATENT DOCUMENTS

| | | | |
|---|---|---|---|
| 9,792,750 | B2 | 10/2017 | Domke et al. |
| 2002/0014120 | A1* | 2/2002 | Wunderer ............. G07D 7/185 73/597 |
| 2009/0032957 | A1 | 2/2009 | Chang |
| 2009/0312957 | A1 | 12/2009 | Domke et al. |
| 2014/0338457 | A1 | 11/2014 | Domke et al. |
| 2016/0232731 | A1 | 8/2016 | Feulner et al. |
| 2017/0061638 | A1 | 3/2017 | Schmalz et al. |

FOREIGN PATENT DOCUMENTS

| | | |
|---|---|---|
| DE | 102013015224 A1 | 3/2015 |
| DE | 102014002273 A1 | 8/2015 |
| WO | 2008009384 A1 | 1/2008 |

OTHER PUBLICATIONS

International Search Report from PCT Application No. PCT/EP2017/000088, dated Jun. 21, 2017.

\* cited by examiner

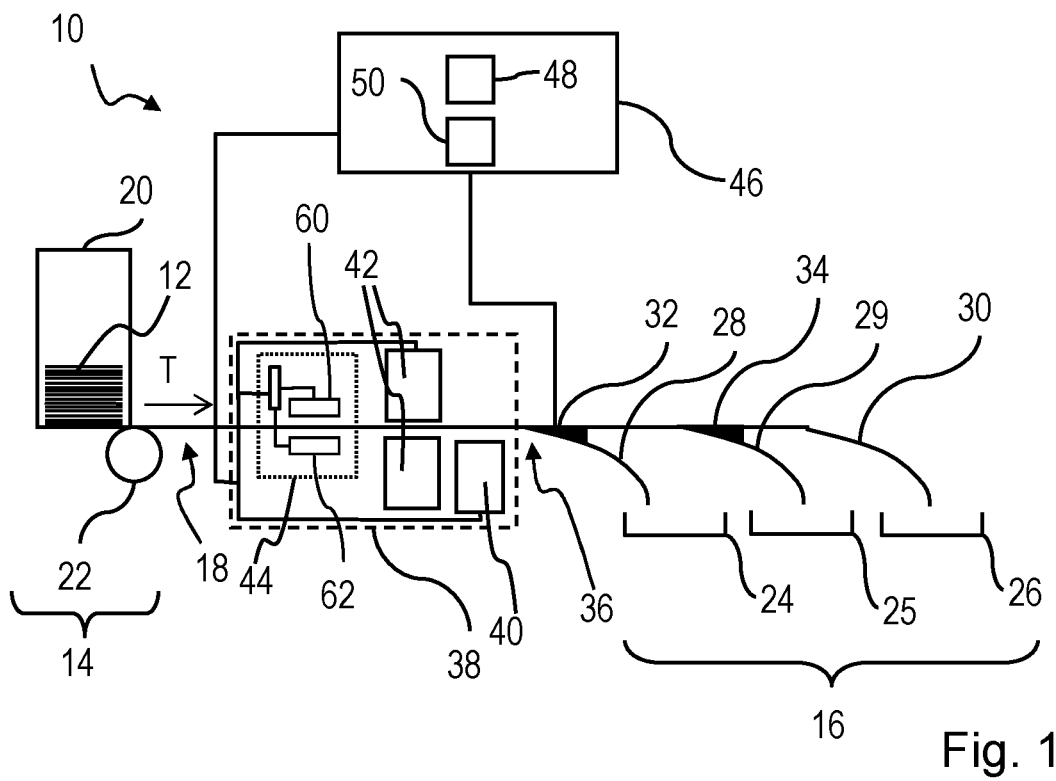
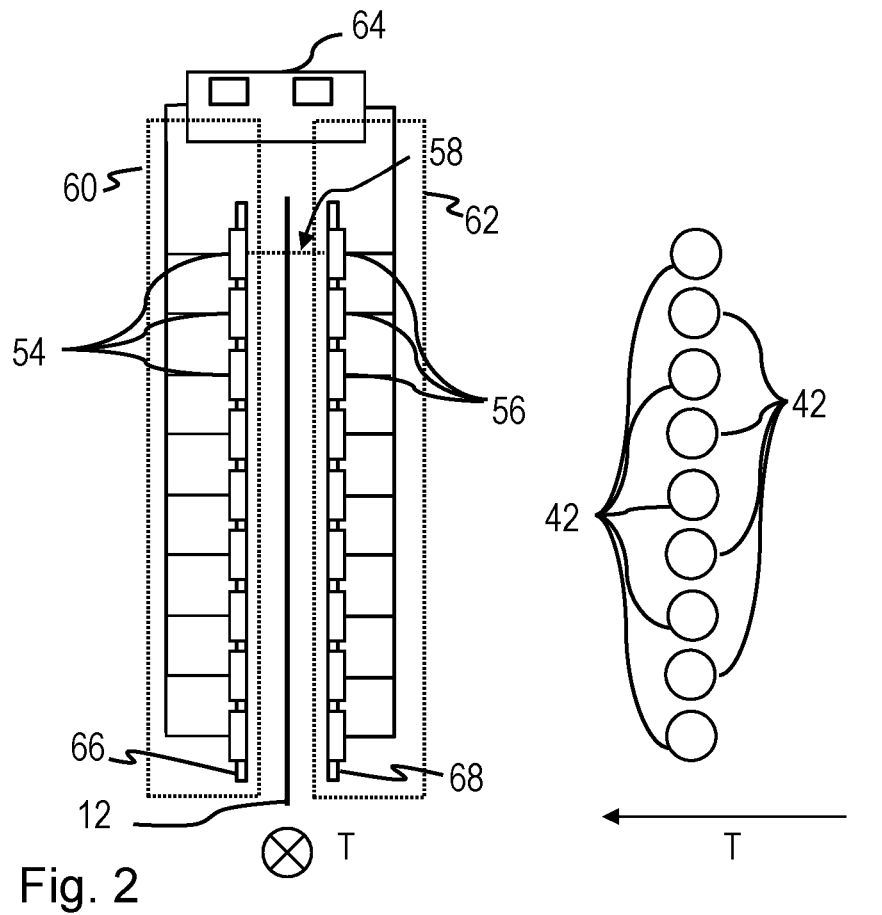
Fig. 1
Fig. 2
Fig. 3

METHODS AND DEVICE FOR CHECKING VALUE DOCUMENTS

BACKGROUND

The present invention relates to a method for examining a value document, in particular as to the presence of wrinkles, as well as means for carrying out the method.

In doing so, value documents are understood to be sheet-shaped objects that represent, for example, a monetary value or an authorization and hence should not be manufacturable arbitrarily by unauthorized persons. They hence have features that are not easy to manufacture, in particular to copy, whose presence is an indication of authenticity, i.e. the manufacture by a body authorized for this purpose. Important examples of such value documents are chip cards, coupons, vouchers, checks and in particular bank notes.

Ideally the state of value documents should substantially correspond to that of freshly printed value document. In actuality, however, the state of value documents deteriorates when these are in circulation and in use. Depending on the deterioration, value documents can then no longer readily be processed by machine. Hence, value documents are checked by machine as to their state and, depending on their established state, destroyed.

Upon their use, value documents can in particular become wrinkled, wherein they obtain irregularly aligned and/or distributed, frequently small, creases which are also designated wrinkles and deteriorate the state. Hereinafter, "wrinkledness" is understood by as the presence of wrinkles. Upon machine processing of value documents, for example, acceptance or singling or output and/or check for authenticity, such wrinkles can cause difficulties. In addition, wrinkles impair the appearance of value documents. Value documents with too many or too strong wrinkles should hence be recognized and taken out of circulation.

SUMMARY

The present invention is hence based on the object of supplying a method for examining a value document in which the presence of wrinkles is checked. It is further object of the present invention to supply means for carrying out the method.

The object is achieved by a method having the features of Claim 1 and in particular by a method for examining a value document in which ultrasonic pulses are emitted onto several locations on the value document, and respectively an echo pulse arises by reflection of at least a portion of a respective ultrasonic pulse at the value document, the echo pulses are received while forming echo values, and a characteristic value is established from the echo values for a wrinkledness of the value document.

The object is achieved further by an apparatus having the features of the claim 10 and in particular an apparatus, for examining a value document transported along a transport path, having a transmitting device which has at least one ultrasonic transmitting element and is devised for emitting ultrasonic pulses onto different locations on a value document in the transport path, a receiving device which has at least one ultrasonic receiving element and is devised for receiving echo pulses which have arisen from the ultrasonic pulses emitted by the transmitting device by reflection at the value document in the transport path, and for forming echo values, and an evaluation device which is configured to establish from the echo values a characteristic value for the wrinkledness of the value document. The method according to the invention can be carried out with an apparatus according to the invention.

According to the invention, the value document is examined with ultrasound. Within the framework of the present invention, ultrasound is understood to mean sound having frequencies in the range between 40 kHz and 3 MHz, preferably between 40 kHz and 800 kHz, particularly preferably 100 kHz and 500 kHz.

Further, the ultrasound is emitted in the form of ultrasonic pulses. These can preferably have a pulse duration in the range of 5 µs to 50 µs.

For generating the ultrasound, the apparatus has the transmitting device, which has at least one ultrasonic transmitting element, for example an ultrasonic transducer, which can be designed for emitting the ultrasonic pulses with a pre-specified ultrasonic frequency.

For receiving ultrasonic pulses, the receiving device is provided, which has at least one ultrasonic receiving element, for example an ultrasonic transducer, which can be designed for receiving ultrasonic pulses having the frequency and duration of the ultrasonic pulses emitted by the transmitting device. The receiving device is further devised to form, upon reception of a pulse, a value which describes the power or energy or amplitude transferred from the ultrasonic pulse onto the ultrasonic receiving element, or which is a monotonic function of this power, energy or amplitude. For example, a logarithmic amplifier can be employed.

The value document is examined in a spatially resolved manner with the ultrasonic pulses, i.e. ultrasonic pulses are emitted onto different locations on the value document. Although it is possible to utilize an ultrasonic transmitting element and an ultrasonic receiving element for each of the locations, for examining the value document is transported preferably at a pre-specified transport speed in a pre-specified transport direction along a transport path. The transmitting device and the receiving device can then be configured such that ultrasonic pulses are emitted and received such that using an ultrasonic transmitting element and an ultrasonic receiving element, ultrasonic pulses are emitted onto locations along a track running parallel to the transport direction, and pulses emitted from these locations are received. Preferably, the transmitting device can have several ultrasonic transmitting elements and the receiving device several ultrasonic receiving elements, preferably a number of the ultrasonic transmitting elements corresponding to the number of ultrasonic receiving elements, which are arranged, preferably in line-type fashion, respectively transversely to the transport direction in which the value document is transported along the transport path. These devices can then be further configured as described in this paragraph such that ultrasonic pulses are emitted from the several ultrasonic transmitting elements onto locations along tracks corresponding to the ultrasonic transmitting elements, and pulses which emanate from these locations are received. In this manner the entire value document can be examined.

In the method, the ultrasonic pulses are emitted onto different locations of the value document and the pulses are emitted in a pre-specified direction as is pre-specified in the apparatus by corresponding alignment of the at least one ultrasonic transmitting element relative to the transport path. Simplified, one can imagine the further operations as follows. In principle, several processes are possible, depending on the configuration of the apparatus and the form of the value document: Transmission through the value document, reflection at the value document and reflections at the transmitting device and/or receiving device. On the one hand, the emitted ultrasonic pulse or only a portion of the emitted ultrasonic pulse can be received without having been reflected at the value document, wherein, however, reflections at the transmitting device and/or receiving device are possible. Within the framework of the present invention, such pulse portions are designated as direct portions. On the other hand, the emitted ultrasonic pulse can, until it is received, be reflected at least once at the value document, wherein the pulse, where applicable, before the reflection can have been transmitted by the value document and/or can reflected at the transmitting device and/or receiving device. Such an ultrasonic pulse or portion of an ultrasonic pulse is designated as echo pulse. In principle, echo pulses are possible which have arisen from n-fold reflection at the value document, wherein n is a natural numeral greater than 1; these echo pulses are designated as n-th echo pulses. Within the framework of the present invention, the echo pulses which have the identical n, preferably n=1, are in connection with the method or the apparatus designated as echo pulses. Both pulse types, direct portions and echo pulses, have the identical frequency and pulse duration except for, where applicable, transport effects, as the emitted ultrasonic pulse from which they have arisen.

If a pulse is reflected at the value document, the echo pulse arises which travels first in a direction which depends approximately on the angle of incidence of the ultrasonic pulse to the surface normal to the surface of the value document at the impingement location. Because the surface of a value document in the region of wrinkles, i.e. locally, has an orientation that varies with the location, i.e. deviates from the orientation of a region without wrinkles, the angle of incidence also varies correspondingly. This leads to the echo pulse traveling in an emergent direction varying correspondingly to the angle of incidence. Because the ultrasonic receiving element is stationary relative to the ultrasonic transmitting element, depending on the angle of incidence, the entire echo pulse or only a portion of the echo pulse, dependent on the angle of incidence, impinges the ultrasonic receiving element. This forms an echo value which depends on the amplitude of the echo pulse and in particular also on the portion of the echo pulse, which impinges on the ultrasonic receiving element, and its direction. In an planar, i.e. wrinkle-free value document, the pulses impinge ideally onto the ultrasonic receiving element such that these impinge an area as large as possible, preferably the entire area of the ultrasonic receiving element or its transducer, at at least approximately the same angle, preferably at least approximately 90°, and the echo values for different locations scatter only unsystematically. In contrast, the presence of wrinkles leads to a deflection of the echo pulses, so that they impinge the ultrasonic receiving element only partly and/or at another angle, and with it to a distribution of echo values changed by the presence of the wrinkles or the other angles. From the echo values, hence a characteristic value for a wrinkledness of the value document can be established.

While employing a pre-specified criterion for the characteristic value, preferably a state of the value document can then be established. In the examination apparatus, the evaluation device can preferably be configured to establish a state of the value document while employing a pre-specified criterion for the characteristic value. In particular, the establishment of the state can comprise the assignment of one of at least two different state classes. A signal identifying the class can then be emitted. For establishing an overall condition, the characteristic value can be employed directly or also the established state class together with at least one other evaluation result which was established while employing another sensor. The signal identifying the class can be employed for at least one element of a sorting device for sorting the value documents, for example a gate by means of which value documents are feedable to different output devices.

In the apparatus, ultrasonic transmitting elements and ultrasonic receiving elements preferably are aligned with each other such that these, i.e. respectively one of the ultrasonic transmitting elements and one of the ultrasonic receiving elements, respectively form an ultrasonic path. On the one hand, this can mean that the ultrasonic transmitting element and the ultrasonic receiving element are arranged relative to each other and are aligned with each other such that pulses emitted from the ultrasonic transmitting element impinge the ultrasonic receiving element via a straight path, preferably such that the value formed by the ultrasonic receiving element upon reception is very large. In this case the ultrasonic path crosses the transport path. On the other hand, ultrasonic transmitting element and ultrasonic receiving element can be arranged and aligned such that ultrasonic pulses emitted from the ultrasonic transmitting element travel to the ultrasonic receiving element only after reflection at a planar surface in the transport path, for example, a planar surface of a wrinkle-free or planar value-document portion. The ultrasonic path is then the stretch along which a sent ultrasonic pulse travels straight by reflection at the ultrasonic receiving element and impinges this, preferably such that from the value formed by the ultrasonic receiving element upon reception is very large. From this viewpoint, wrinkles of a value document lead to ultrasonic pulses being deflected from the ultrasonic path by wrinkles, even if only a little, where applicable.

For the evaluation of the echo values formed by the receiving device, the evaluation device, which for this purpose can have a controller and/or a processor and/or an FPGA, is used in the apparatus. In a storage of the evaluation device the program code can then be stored upon whose execution by the processor or controller the characteristic value is established. The characteristic value can be stored or outputted to another device.

The characteristic value can be established in different ways. Surprisingly it was found that it can be preferred in the method that it can be preferred that upon establishing the characteristic value for a distribution of the echo values, a value is established which is a measure for the position of an asymmetric distribution. Particularly preferably, a p-quantile for a numeral p with $0.4<p<0.6$, preferably the median, can be employed as a measure for the position of an asymmetric distribution. In the apparatus, the evaluation device can for this purpose preferably be configured to establish, upon establishing the characteristic value for a distribution of the echo values, a value which is a measure for the position of an asymmetric distribution. Particularly preferably, it can be configured to employ a p-quantile for a numeral p with $0.4<p<0.6$, preferably the median, as a measure for the position of an asymmetric distribution. The characteristic value can preferably be a monotonic function of the value or also be formed by the value itself. This procedure is quickly carried out and delivers good results.

Alternatively or additionally it can be preferred in the method to establish, upon establishing the characteristic value for a distribution of the echo values, a value which is a measure for an asymmetry of a distribution of the echo values captured for the value document. In the apparatus, the evaluation device can for this purpose preferably be configured to establish, upon establishing the characteristic value, a value which is a measure for the asymmetry of a distribution of the echo values captured for the value document. The characteristic value can preferably be a monotonic function of the value or also be formed by the value itself.

In principle, any measure can be employed as a measure for the asymmetry of the distribution. In the method, however, it is preferred that a difference between the mean value and the median of the echo values or the distribution of the echo values is employed as a measure for the asymmetry. For this purpose, in the apparatus, the evaluation device is preferably configured to employ a difference between the mean value and the median of the echo values or the distribution as a measure for the asymmetry. The mean value is preferably understood as the arithmetic mean value.

Alternatively or, where applicable, also additionally, the skewness or the third central moment of the distribution can be employed as a measure for the asymmetry. In the apparatus, the evaluation device can for this purpose preferably be configured to employ the skewness of the distribution as a measure for the asymmetry.

In particular it can be preferred, upon establishing the characteristic value for a distribution of the echo values, to establish a linear combination from a value which is a measure for the position of an asymmetric distribution, for example the above-described value, and a value which is a measure for an asymmetry of a distribution of the echo values captured for the value document, for example the previously mentioned value, and preferably to utilize said linear combination as a characteristic value. The coefficients of the linear combination can preferably be established by adapting to training data sets for value documents, for example linear regression. The characteristic value can preferably be a monotonic function of the value of the linear combination or also be formed by the value of the linear combination itself.

The transmitting device and the receiving device can be arranged relative to the transport path in different ways.

According to a first embodiment, the echo pulses can in the method be received on the same side of the transport path or value document in the transport path on which they were also sent. For this purpose, in the apparatus, the transmitting device and the receiving device can be arranged on the same side of the transport path, and an ultrasonic path between the ultrasonic transmitting element and the ultrasonic receiving element, along which one ultrasonic pulse emitted by the ultrasonic transmitting element travels under reflection on a wrinkle-free value document in the transport path to the ultrasonic receiving element, have two portions inclined against the transport direction.

According to another embodiment, the echo pulses can in the method be received on one of the side of the transport path or the value document in the transport path which opposes the side of the transport path or the value document in the transport path onto which the ultrasonic pulses were emitted. The ultrasonic pulses can thus be emitted on a first side of the value document and the echo pulses are received on a second side opposing the first side of the value document. For the apparatus, it is then preferred that the transmitting device and the receiving device are arranged on mutually opposing sides of the transport path, and preferably an ultrasonic path formed by the respective ultrasonic transmitting element and ultrasonic receiving element crosses the transport path and preferably runs at least approximately orthogonally to the transport path. This embodiment allows in particular a further utilization of the ultrasonic transmission and receiving elements, as described hereinafter.

In the method, the direct portions of the ultrasonic pulses can also be utilized in a development. Thus there can in a preferred development of the method, respectively a direct portion of the ultrasonic pulses which is received without reflection at the value document while forming a direct value, and before or upon the establishing of the characteristic value, the echo values for a respective echo pulse while employing the direct value for the direct portion of the same ultrasonic pulse by which the echo pulse was formed be corrected and/or the direct values can be employed for the establishment of another property of the value document. In the apparatus, the receiving device can for this purpose further be configured such that respectively a direct portion of the ultrasonic pulses which is received without reflection at the value document while forming a direct value for the direct portion, and the evaluation device can further be configured to correct, before or upon the establishing of the characteristic value, the echo values for a respective echo pulse while employing the direct value for the direct portion of the same ultrasonic pulse by which the echo pulse was formed, and/or to employ the direct values for establishing another property of the value document. The reliability of the characteristic value can be increased by the employment according to the first alternative, because influences of the fluctuations in the weight per unit area, which are not due to wrinkles but rather constitute a feature of the value document, for example watermarks, are at least partly compensated for. According to the second alternative, the apparatus and the method can additionally be employed also for establishing other value-document properties which can be physical properties of the value document or also transport properties of the value document. For example, the limpness of value documents belongs to the physical properties. A corresponding method is described in WO 2008/009384 A1 of the applicant, whose content is hereby incorporated in the description by reference.

Preferably in the method the direct portion of a respective ultrasonic pulse and the echo pulse of the same ultrasonic pulse are received by means of the same ultrasonic receiving element. The apparatus is preferably configured such that the same ultrasonic receiving elements receive direct portions as well as echo pulses.

For receiving the direct portion, the receiving device can have at least one additional ultrasonic receiving element, preferably as many ultrasonic receiving elements as there are ultrasonic transmitting elements present, which form with the ultrasonic transmitting elements respectively an ultrasonic path. The evaluation device can then be connected to these additional ultrasonic receiving elements via signal connections. This embodiment is particularly suitable if the ultrasonic pulses are emitted obliquely, thus not orthogonally, onto the value document and particularly if ultrasonic transmitting elements and ultrasonic receiving elements are arranged for the echo pulses on the same side of the transport path or value document in the transport path.

It is, however, also possible to employ the ultrasonic receiving elements provided anyway for receiving the direct portion. The receiving device is then configured to receive the direct portions and to form direct values, as well as to receive the echo pulses and to form echo values. This makes it possible to employ the apparatus for two purposes, wherein the ultrasonic transmission and receiving elements, where applicable, including their actuation or signal processing, need to be present only once. This embodiment is particularly preferred in the case that the ultrasonic transmitting elements of the transmitting device and the ultrasonic receiving elements of the receiving device are arranged on mutually opposing sides of the transport path and the ultrasonic path or ultrasonic paths run between these at least approximately orthogonal to the transport path, more precisely the plane of the transport path or a value document in the transport path. Because the direct portion travels a shorter path from the respective ultrasonic transmitting element to the respective ultrasonic receiving element, it reaches the respective ultrasonic receiving element earlier than the echo pulse, the time difference lies in the order of magnitude of the ultrasonic pulse travel time for the distance between ultrasonic transmitting element and ultrasonic receiving element. The receiving device is then preferably configured to receive, after a pre-specified time interval after reception of a direct portion, i.e. forming of a direct value, an echo pulse, i.e. to form an echo value. Upon the emission of an ultrasonic pulse, the transmitting device can emit a signal to the receiving device. The receiving device can then be configured to receive, in dependence on this signal, preferably roughly after the stated travel time, the direct portion and later, preferably after roughly twice the stated travel time after the signal, the echo pulse.

The apparatus according to the invention and the method according to the invention can be employed in particular in apparatuses for processing value documents. The subject matter of the present invention is hence also an apparatus for processing value documents, having a feeding device for receiving value documents to be processed, an output device for outputting or receiving the processed value documents, a transport device for transporting the value documents from the feeding device along a transport path to the output device and at least an apparatus according to the invention arranged in the region of a portion of the transport path for examining the value documents which are transported along the transport path.

BRIEF DESCRIPTION OF THE DRAWINGS

The invention will hereinafter be explained further by way of example with reference to the drawings. There are shown:

FIG. 1 a schematic view of an embodiment example for a value-document processing apparatus;

FIG. 2 a schematic representation of an example of an examination apparatus of the value-document processing apparatus in FIG. 1, in a view along a transport direction of value documents, FIG. 3 a schematic representation of ultrasonic transmitting elements of the ultrasonic sensor in FIG. 2 in a plane parallel to the plane of a value document to be examined, FIG. 4 a schematic, partial representation of a portion of a value document having locations or sensing regions acoustically irradiated by the ultrasonic transmitting elements of a transmitting device in FIG. 2, FIGS. 5A and B a schematic representation for illustrating the propagation of ultrasonic pulses of an ultrasonic transmitting element to an ultrasonic receiving element of the examination apparatus in FIG. 2 with presence of a smooth value document or a value document with a crease, FIGS. 6A and 6B schematic histograms for a distribution of the echo values for a smooth value document and a wrinkled value document, FIG. 7 a simplified flowchart for an example of a method for examining the wrinkledness of a value document by means of the examination apparatus in FIG. 2, FIG. 8 a simplified flowchart for a second example of a method for examining the wrinkledness of a value document by means of the examination apparatus in FIG. 2, FIG. 9 a simplified flowchart for a third example of a method for examining the wrinkledness of a value document by means of the examination apparatus in FIG. 2, FIG. 10 a simplified flowchart for a further example of a method for examining the wrinkledness of a value document by means of the examination apparatus in FIG. 2, and FIG. 11 a schematic representation of a further example of an examination apparatus in a direction transversely to a transport path for value documents.

DETAILED DESCRIPTION OF VARIOUS EMBODIMENTS

Figure 4:
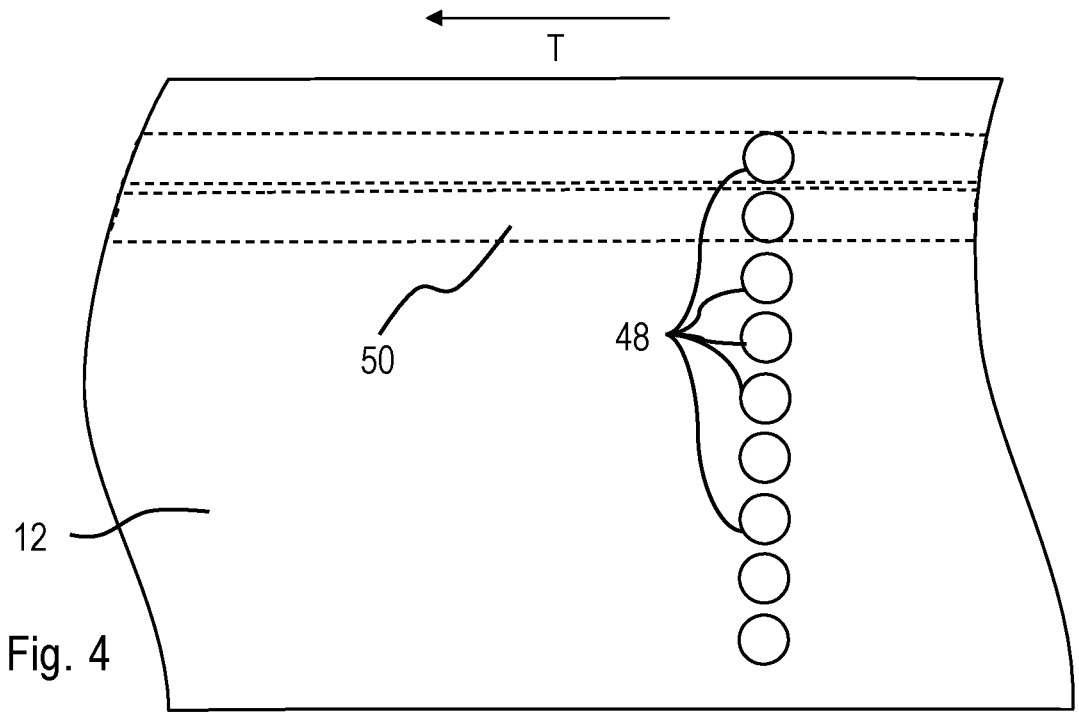

A value-document processing apparatus 10 in FIG. 1, in the example an apparatus for processing value documents 12 in the form of bank notes, is configured for sorting value documents in dependence on the state established by means of the value-document processing apparatus 10, and the authenticity checked by means of the value-document processing apparatus, of processed value documents.

It has a feeding device 14 for feeding value documents, an output device 16 for receiving processed, i.e. sorted, value documents, and a transport device 18 for transporting singled value documents from the feeding device 14 to the output device 16.

The feeding device 14 comprises, in the example, an input pocket 20 for a value-document stack, and a singler 22 for singling value documents from the value-document stack in the input pocket 20 and supplying to or feeding to the transport device 18.

The output device 16 comprises, in the example, three output portions 24, 25 and 26 into which processed value documents can be sorted according to the result of the processing, in the example check. In the example, each of the portions comprises a stack pocket and a stacking wheel (not shown) by means of which fed value documents can be deposited in the stack pocket.

The transport device 18 has at least two, in this example three, branches 28, 29 and 30 at whose ends respectively one of the output portions 24 or 25 or 26 is arranged, and, at the branching points, gates 32 and 34, controllable by positioning signals, by means of which value documents are feedable to the branches 28 to 30 and thus to the output portions 24 to 26 in dependence on positioning signals.

On a transport path 36, defined by the transport device 18, between the feeding device 14, in the example more precisely the singler 22, and the first gate 32 after the singler 22 in the transport direction T, a sensor device 38 is arranged which measures physical properties of value documents while the value documents are being transported past and forms sensor signals rendering the measuring results, which represent sensor data. In this example, the sensor device 38 has three sensors, namely an optical remission sensor 40 which captures a remission color image of the value document, an optical transmission sensor 42 which captures a transmission image of the value document, and an apparatus 44 for examining value documents which captures or measures with ultrasound properties of the value document in a spatially resolved manner.

A machine control and evaluation device 46 is connected via signal connections to the sensor device 38 and the transport device 18, in particular the gates 32 and 34. In connection with the sensor device 38, it classifies a value document in dependence on the signals of the sensor device 38 for the value document into one of pre-specified sorting classes. These sorting classes can be pre-specified, for example in dependence on a condition value established by means of the sensor data and likewise in dependence on an authenticity value established by means of the sensor data. As condition values, for example the values "fit for circulation" or "unfit for circulation" can be employed, as authenticity values the values "forged", "suspect of being forged" or "authentic". In dependence on the established sorting class, it actuates by emitting positioning signals the transport device 18, here more precisely the gates 32 or 34, such that the value document is outputted, in accordance with its sorting class established upon the classification, into an output portion of the output device 16, said portion being associated with the class. The association with one of the pre-specified sorting classes or the classification is effected in dependence on pre-specified criteria for the assessment of the state and the assessment of the authenticity, which depend on at least one portion of the sensor data.

The machine control and evaluation device 46 has for this purpose in particular, besides corresponding interfaces for the sensor device 38 or its sensors and the apparatus 44, a processor 48 and a memory 50 which is connected to the processor 48 and in which at least one computer program with program code is stored upon whose execution the processor 48 controls the apparatus or evaluates the sensor signals of the sensor device 38, in particular for establishing an sorting class of a processed value document, and actuates the transport device 18 in accordance with the evaluation.

The machine control and evaluation device 46 establishes from the sensor signals of the sensor device 38 upon a sensor-signal evaluation at least one value-document property which is relevant for the checking of the bank notes with respect to their authenticity and/or state. Preferably, a plurality of these properties are established. In this example, as optical value-document properties, a transmission image and a remission image and the properties of echo pulses are established in dependence on the location on the value document and therefrom a characteristic value for the wrinkledness.

In dependence on the value document properties, the machine control and evaluation device 46 establishes for the different sensors respective sorting signals that represent whether or not the established value-document properties represent an indication of the state or the authenticity of the value document. In consequence of these signals, corresponding data can be stored in the machine control and evaluation device 46, for example the memory 50, for later employment. In dependence on the sorting signals, the machine control and evaluation device 46 then establishes an overall result for the check according to a specified overall criterion, and forms the sorting or control signal for the transport device 18 in dependence on the result.

For processing value documents 12, value documents 12 inserted into the input pocket 20 as a stack or singly are singled by the singler 22 and fed in singled form to the transport device 18, which transports the singled value documents 12 past the sensor device 38. This captures the properties of the value documents 12, whereby sensor signals are formed which represent the properties of the respective value document. The machine control and evaluation device 46 captures the sensor signals, establishes in dependence thereon an sorting class, in the example a combination of an authenticity class and a state class of the respective value document, and actuates the gates in dependence on the result such that the value documents are transported in accordance with the established sorting class into an output portion associated with the respective sorting class.

The apparatus 44 for examining a value document, which in the example is constructed as follows (cf. FIGS. 2 and 3) serves for establishing a sorting class on the basis of ultrasonic properties.

The apparatus 44 for examining a value document 12 transported along the transport path 36 has a transmitting device 60 for emitting ultrasonic pulses onto different locations on a value document in the transport path 36, and a receiving device 62 for receiving echo pulses having arisen from ultrasonic pulses emitted from the transmitting device 60 by reflection at the value document in the transport path 36 and forming of echo values, as well as an evaluation device 64 connected via signal connections to the transmitting device 60 and receiving device 62, which receives echo values of the receiving device 62 and evaluates these while executing evaluation steps described hereinafter.

The transmitting device 60 is arranged on the one, in the example upper, side of the transport path 36, and has in a holder 66 several ultrasonic transmitting elements 54 arranged transversely to a transport direction T of the value documents 12, in the example ultrasonic transducer 54, for emitting ultrasonic pulses onto the value document 12.

The receiving device 62 is arranged on the side opposing the one side of the transport path 36. It is configured analogously to the transmitting device 60 and likewise has in a holder 68 ultrasonic transducers 56 serving as ultrasonic receiving elements. With respect to the transport path 36, these are arranged opposite the ultrasonic transmission or receiving elements 54 in the same number such that these can receive ultrasonic pulses, brought about by acoustic irradiation with ultrasonic pulses of the ultrasonic transmitters 54, emanating or transmitted from a value document 12 transported along the transport path 36.

The holders 66 and 68 serve not only for receiving and aligning the ultrasonic transducers 54 or 56; their surfaces also form a channel for ultrasound which the transport path 36 leads through.

Each of the ultrasonic transmitting element 54 has associated therewith one of the ultrasonic receiving elements 56 such that there results therebetween an ultrasonic path 58 extending at least approximately orthogonally to a value document 12 transported along the transport path 36, along which ultrasonic path an ultrasonic pulse emitted by the respective ultrasonic transmitting element 54 runs to the ultrasonic receiving element 56 associated therewith. With each pair of ultrasonic transmitters and ultrasonic receiving elements associated therewith or with each ultrasonic path 58 in connection with the evaluation device 64, it is thus possible to establish a value for the property of pulses or pulse portions which emanate directly or indirectly from the location acoustically irradiated with the ultrasound.

The ultrasonic transducers 54 or 56 are configured such that they are well suited for emitting or receiving ultrasonic pulses with a duration in the range of roughly 20 μs, in the example, and an ultrasonic frequency, i.e. a frequency maximum of the spectrum of the ultrasonic pulse, of roughly 400 kHz, in the example. Further, they are dimensioned such that a respective spot, i.e. sensing region, irradiated upon irradiation with the ultrasonic pulses on a value document 12 transported along the transport path 36 has a diameter of roughly 2 mm. Each of the sensing regions has associated therewith, as the location, the center of the sensing region.

In the example, the ultrasonic transmitting elements 54 and the ultrasonic receiving elements 56 associated respectively therewith are arranged in a row running transversely to the transport direction. The ultrasonic transducers of a respective row are arranged equidistantly and are operated simultaneously.

Figure 5A:
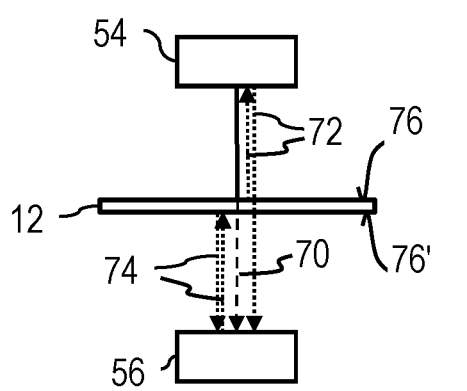

For pre-specified locations on the value document, ultrasonic pulses are hence emitted onto different locations of the value document. The operations for different ultrasonic pulses are analogous, so that these are described by the example of a pulse. FIG. 5A shows schematically the processes for a planar portion of the value document without wrinkles, FIG. 5B for a portion of the value document which is inclined on account of a crease 69.

Figure 5B:
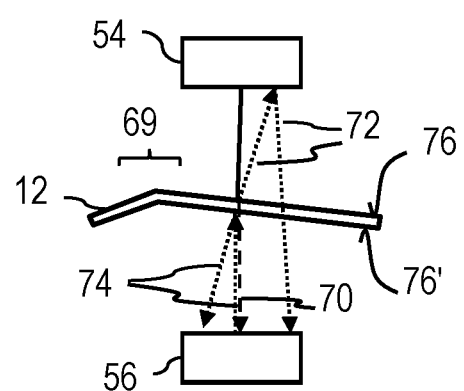

After emission of an ultrasonic pulse by an ultrasonic transmitting element 54 onto a location on the value document 12, this impinges on the value document 12. Thereby at least three portions of the ultrasonic pulse arise: A transmission portion or direct portion 70 of the pulse, which is represented by dashed lines in FIGS. 5A and 5B, is transmitted by the value document 12 and arrives without further reflection at the value document, thus directly, along the ultrasonic path 58 at the ultrasonic receiving element 56 at the other end of the ultrasonic path. Because ultrasonic transmitting element and ultrasonic receiving element oppose each other, the direct portion 70 of the ultrasonic pulse will completely impinge on the ultrasonic receiving element 56 which upon reception the transmission portion forms a signal which represents a corresponding transmission value or direct value.

Two further portions 72 and 74 designated as echo pulses arise from reflection of the ultrasonic pulse at the value document 12 or the surface 76 of the value document 12 facing the ultrasonic transmitting element 54 or by reflection of the transmission portion 70 or direct portion of the ultrasonic pulse at the ultrasonic receiving element 56 and thereafter at the surface 76' of the value document 12 facing the ultrasonic receiving element.

The echo pulse 72 arrives, after reflection at the ultrasonic transmitting element 54 or the boundary surface of the holder 66 in the region of the ultrasonic transmitting element 54, back at the value document 12 which transmits this. The transmitted echo pulse 72 can then be received by the ultrasonic receiving element 56 while forming an echo value.

The echo pulse 74, which has arisen by reflection of the transmission portion or direct portion 70 at the ultrasonic receiving element 56, after the reflection at the surface 76' of the value document 12, arrives directly at the ultrasonic receiving element 56 where it is received while forming a corresponding echo value.

As can be recognized in FIG. 5A, for a planar portion of the value document 12, when this is located at roughly the middle between the ultrasonic transmitting element and the ultrasonic receiving element, the two portions 72 and 74 arrive at the ultrasonic receiving element 56 at roughly the same time, but delayed by a travel time relative to the transmission portion or direct portion, which corresponds to the extended path, here the distance between value document and ultrasonic transmitting element or value document and ultrasonic receiving element. Further, both portions impinge from the substantially identical direction as the transmission portion or direct portion coming at the ultrasonic receiving element 56, so that this forms an echo value which depends solely on the amplitude of the echo portion.

As can be recognized in FIG. 5B, the surface of the value document 12 for a wrinkle or a crease 69 runs not at a right angle to the connection line between ultrasonic transmission and ultrasonic receiving element or the ultrasonic path 58, but rather is inclined thereto at an angle deviating from 90°. This has the consequence that, after reflection of the ultrasonic pulse at the value document 12, the echo portions 72 or 74 are propagated on paths which are inclined compared with the ultrasonic path 58. This has the consequence that the echo portions 72 or 74 impinge only on a portion of the ultrasonic receiving element 56 which is smaller than in orthogonal impingement, so that this forms an correspondingly smaller echo value. Here, too, the echo portions 72 and 74 arrive at the ultrasonic receiving element delayed by a travel time corresponding to the additional travel distance.

Figure 6A:
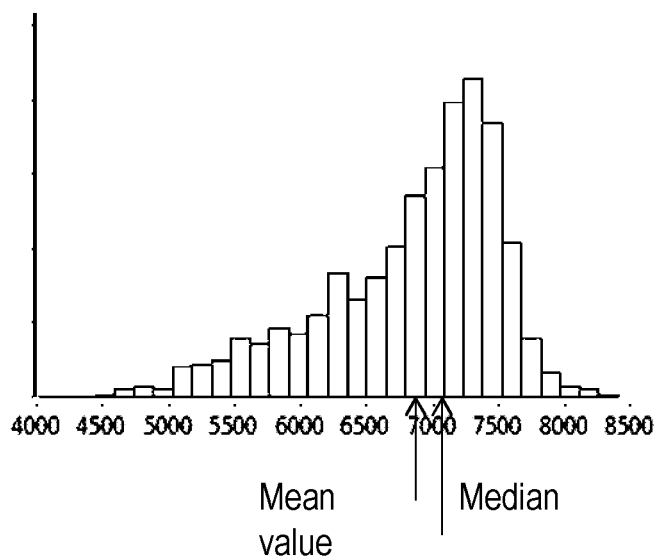
Figure 6B:
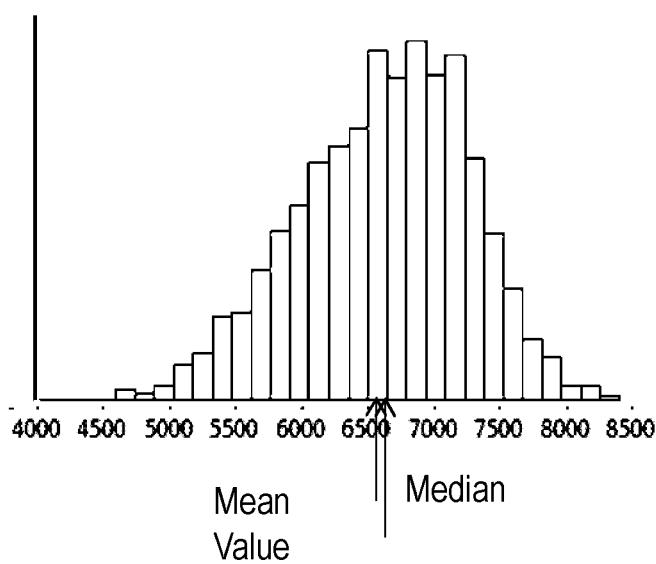

For a value document there results a distribution of the echo values which is more or less asymmetrical depending on the degree of wrinkling. In a histogram representation, FIG. 6A shows very schematically such a distribution for a slightly wrinkled value document, FIG. 6B for a very wrinkled value document. On the abscissa, the echo value is inscribed in arbitrary units, on the ordinate the rate of occurrence, likewise in arbitrary units. It is to be recognized that a little wrinkled value document has a more asymmetric distribution which has her maximum with higher echo values, while for a more wrinkled value document the distribution while still being asymmetric, is more symmetric and is displaced to lower echo values.

In the Figures, the mean value and the median of the respective distribution are further shown. It can be recognized that in the more symmetric distribution, the difference between median and mean value is less than in the less symmetric distribution.

The transmitting device is configured such that the ultrasonic transmitting elements 54 or ultrasonic transducers are operated synchronously in pulsed fashion. In this exemplary embodiment, the actuation is effected independently of the entry of a value document 12 into the capture region of the apparatus 44. The receiving device is configured for receiving ultrasonic pulses as follows.

The ultrasonic receiving elements 56 receive respectively ultrasound and form sensor signals which represent the intensity or power of individual ultrasonic pulse portions which have met the ultrasonic transducer as a function of time and with it also of the location because of the constant transport speed. The receiving device 62 forms from the sensor signals values which simply represent the received ultrasonic pulse energies, assuming an in principle constant transmit power of the ultrasonic transmitting elements 54. In other exemplary embodiments, however, it is also possible to divide the received ultrasonic pulse energies by a specified or measured ultrasonic pulse energy of transmitted pulses and thus obtain normalized values.

When a value document 12 is transported at constant, suitably pre-specified speed through the ultrasonic paths 58, corresponding direct values are captured during the transport at the pre-specified first times respectively after emission of the ultrasonic pulses. The pre-specified first times or time intervals correspond to roughly the travel time of the ultrasonic pulses of the ultrasonic transmitting elements to the ultrasonic receiving elements or along the respective ultrasonic path.

Further, echo pulses are received by the receiving device 62. More precisely, the receiving device 62 is configured such that at the pre-specified second times, echo values are captured for received echo pulses. The pre-specified second times or time intervals correspond to roughly twice the travel time of the ultrasonic pulses from the ultrasonic transmitting elements to the ultrasonic receiving elements or along the respective ultrasonic path. For capturing the point in time of the emission of an ultrasonic pulse for a location, the transmitting device 60 can be configured to send a signal to the receiving device 62 which employs this for the establishment of the reception time.

By the alternating operation, there results a regular arrangement of sensing regions or locations on the value document 12, which in the example is an arrangement on a rectangular grid.

In this embodiment example, the transmitting device 60 has 24 ultrasonic transmitting elements, the receiving device the identical number of ultrasonic receiving elements. Hence, in this embodiment example the apparatus 44 has twenty-four ultrasonic transmitting element/ultrasonic receiving element pairs or ultrasonic paths 58 which are arranged such that the corresponding locations have a distance between 3 and 4 mm.

The frequency with which the ultrasonic pulses are successively emitted and the transport speed of the value document are chosen such that along the transport direction of the value document, echo values are captured for locations at the distance of 3 mm, preferably 2 mm, along the transport direction or fifty or more echo values.

For evaluating the echo values and the direct values for a value document, the evaluation device 64 has a storage in which the echo values and the direct values are stored and in which the program code of a computer program is stored, and a processor for executing the computer program. Upon execution of the computer program by the processor, the evaluation steps S12 to S16 of the following method are carried out.

Figure 7:
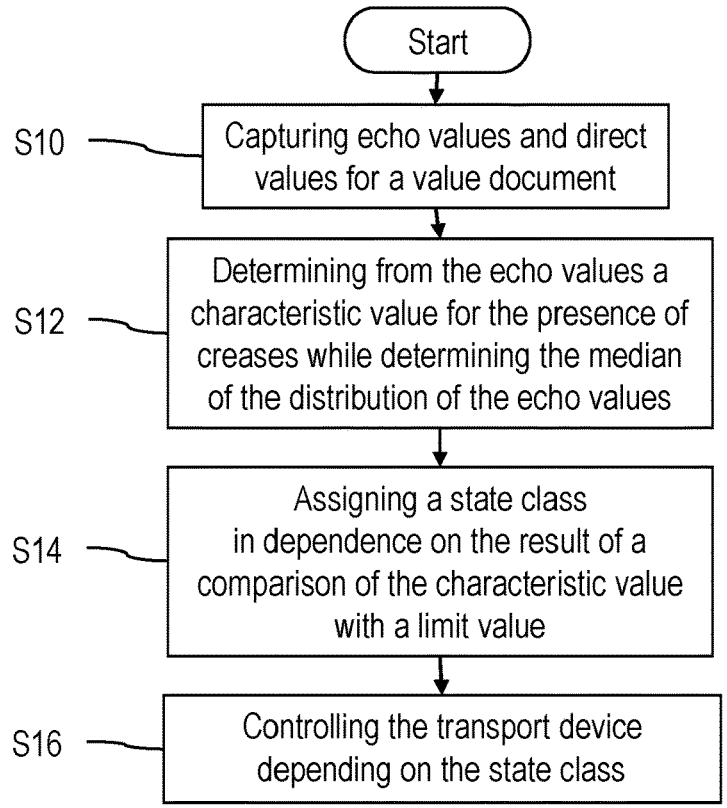

In a first embodiment example for a method for examining a value document as to the presence of wrinkles or wrinkledness, which is illustrated in FIG. 7 very schematically, the following steps are executed by means of the examination apparatus 44.

In Step S10, echo values and direct values are captured for a value document. For this purpose, the transmitting device 60 emits, by means of the ultrasonic transmitting elements in constant time intervals, ultrasonic pulses onto the value document 12 which is transported past the transmitting device 60 at a pre-specified constant transport speed along the transport path. In the process, the receiving device 62 receives direct portions and echo pulses which have arisen from ultrasonic pulses emitted onto the value document, and forms corresponding direct and echo values which are stored in the evaluation device 64.

The evaluation device 64 establishes in Step S12 from the echo values received for the value document a characteristic value for the presence of wrinkles or the wrinkledness of the value document.

For this purpose, it establishes for the distribution of the echo values for the respective value document a value which is a measure for the position of an asymmetric distribution, in this example 0.5-quantiles or the median of the distribution. In other embodiment examples, a 0.4- or 0.6-quantile could for example also be employed.

This value is employed as a characteristic value and is stored.

In Step S14, the characteristic value is compared with a limiting value, which for the value document of the type which the checked value document is, and a pre-specified wrinkledness is characteristic. In dependence on the result of the comparison, the value document is assigned one of the classes "little or not wrinkled" or "too wrinkled" and a signal is formed, which describes whether the value document was recognized as too wrinkled or as having too many or too pronounced creases. In this example it is checked more precisely whether the characteristic value, here the median, is smaller than the limiting value.

This signal can then be employed in Step S16 upon the establishment of an overall condition to which the transport device is accordingly controlled.

Figure 8:
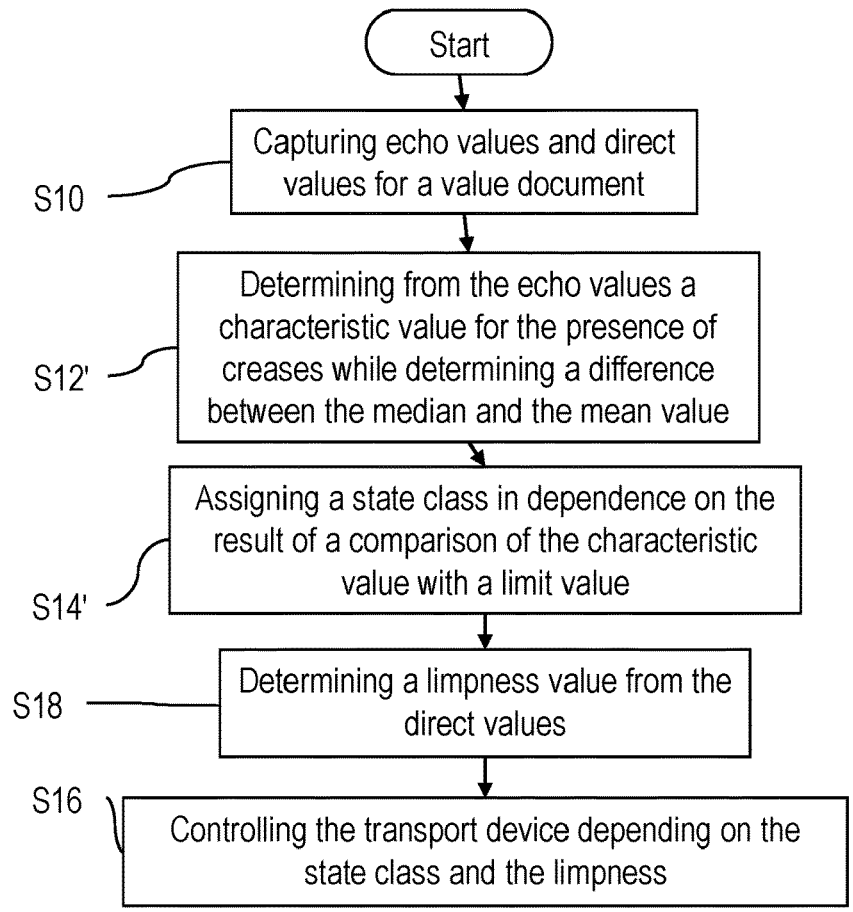

A second embodiment example, whose flowchart is illustrated in FIG. 8 very schematically, differs from the first embodiment example by the fact that the steps S12 and S14 are replaced by the steps S12' and accordingly S14'. Otherwise, the method does not differ from the first embodiment example.

Step S12' differs from step S12 only by the fact that upon establishing the characteristic value, a value is now established which is a measure for the asymmetry of the distribution of the echo values captured for the value document.

More precisely, the difference of the median of the echo values and the arithmetic mean value of the echo values is in this embodiment example employed as a measure for the asymmetry of the distribution. This difference is stored as a characteristic value for the wrinkledness.

Step S14' differs from step S14 only by the fact that another limiting value is employed for the assignment of the classes.

Figure 9:
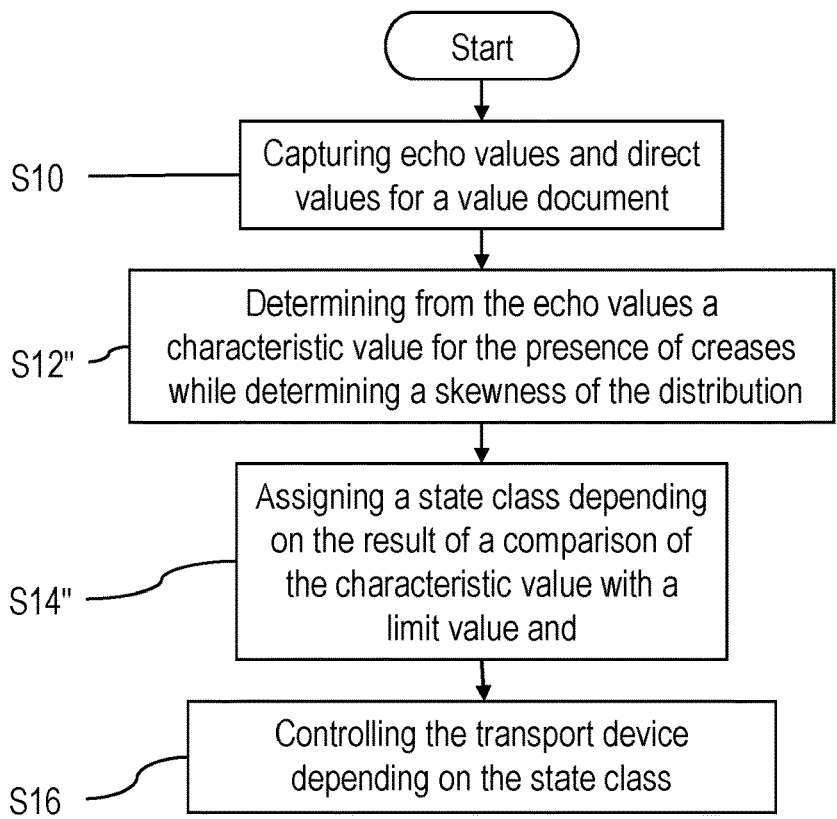

The third embodiment example (cf. FIG. 9) differs from the second embodiment example only by the fact that step S12' is replaced by Step S12" and Step S14' by Step S14". In Step S12", now the skewness of the distribution, which here also forms the characteristic value, is employed upon establishing the characteristic value as a measure for the asymmetry of the distribution. When for a distribution of the N echo values $x_i$ for i=1, ..., N $$\mu_1 = \frac{1}{N}\sum_{i=1}^{N} x_i$$

designates the mean value and for each natural numeral n>1

$$\mu_n = \frac{1}{N}\sum_{i=1}^{N} (x_i - \mu_1)^n$$

the n-th moment, the skewness ν of the distribution is then given by $$\nu = \frac{\mu_3}{\mu_2^{3/2}}$$

Step S14", which replaces Step S14', differs from this only in that the limiting value is chosen differently.

Figure 10:
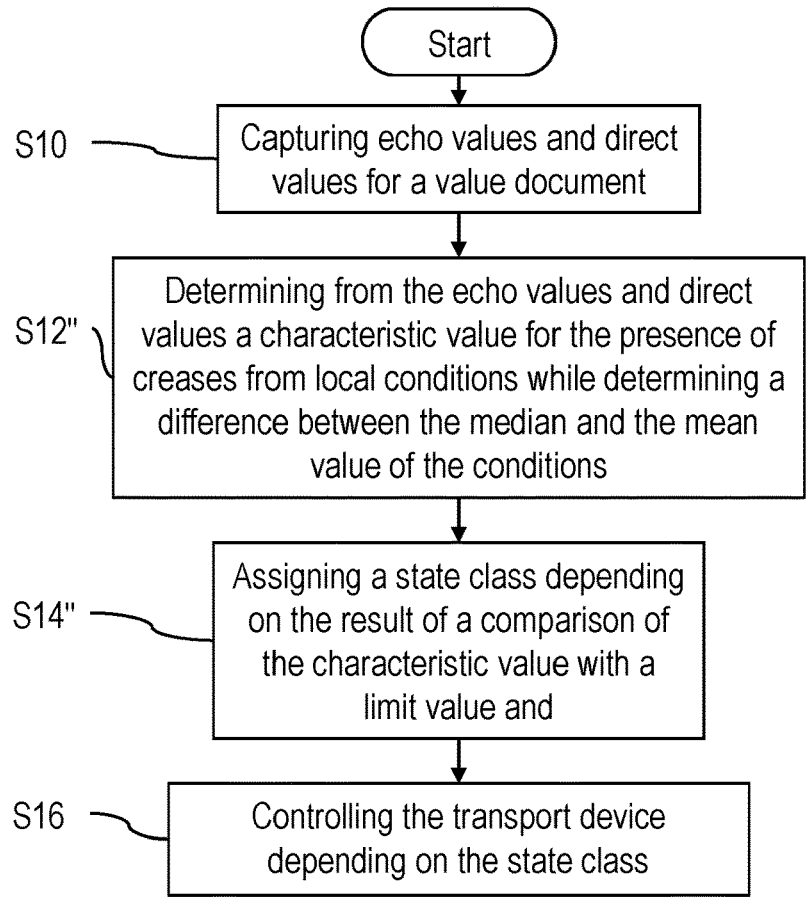

A further embodiment example (cf. FIG. 10) differs from the first embodiment example in that the receiving device is configured such that for respectively one location on the value document, the direct value and the echo value for respectively one location are stored mutually associated and in so far as step S10 is replaced by the otherwise unchanged step S10'''.

Further, Step S12''' replaces Step S12' and differs from this solely in that the echo value is corrected for a respective location while employing the direct value for the respective location. More precisely, median and mean value are formed, rather than for the echo values for the locations for the ratios from echo values and direct values for the respective locations.

Moreover, in an additional step S18 a value is determined from the direct values for the limpness of the value document. A corresponding method is described in WO 2008/009384 A1 of the applicant, whose content, in particular the first embodiment example therein, is hereby incorporated in the description by reference.

In a corresponding manner, in a variant of the third embodiment example the skewness of the distribution is formed for the ratios of echo values and direct values.

In other embodiment examples, the signals of the ultrasonic receiving elements or transducers are amplified logarithmically and the direct values or echo values formed from these amplified signals. The correction of the echo values can then be effected by subtraction. Otherwise the embodiment examples are unchanged, except for, where applicable, the magnitude of the limiting values.

Figure 11:
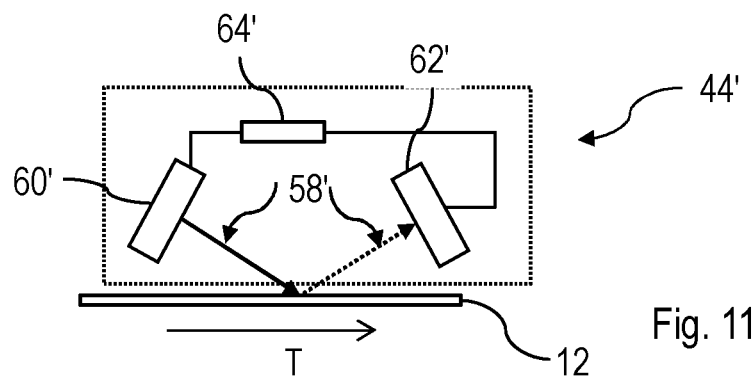

Further embodiment examples in FIG. 11 differ from the first three embodiment examples by the fact that the examination apparatus 44' is now configured such that the ultrasonic path 58' from the transmitting device 60 to the value document 12 and further to the transmitting device 62' has portions inclined to the transport direction T, and the transmitting and receiving device 60' or 62' are arranged on the same side of the transport path, so that echo pulses without further reflection at the transmitting device or receiving device arrive at the receiving device. The transmitting device 60' and the receiving device 62' are configured analogously to the transmitting device 60 or receiving device 62, wherein, however, no direct values are received. The methods correspond to those of the first three embodiment examples, wherein, however, no direct values are formed and are employed. Accordingly, the evaluation device 64' is changed compared with the evaluation device 64.

Further embodiment examples can differ from the above-described embodiment examples in that the evaluation device and the machine control and evaluation device are integrated into one device.

Still other embodiment examples can differ from the above-depicted embodiment examples by the fact that respectively Step S12, S12', S12" or S12''' is replaced by Step $S12^{(4)}$. In this step, first the values W or W' are established according to the steps S12 and S12', which are employed as characteristic values in these steps. As a characteristic value $W^{(4)}$, a linear combination of these values is then employed:

$$W^{(4)} = \alpha \cdot W + \beta \cdot W' + \gamma.$$

In the process, the coefficients α, β and γ are establishable or have been established in the example by linear regression from the measurement values for the training value documents for which a wrinkle value is present.

The invention claimed is:

1. A method for examining a value document, the method comprising:
    emitting ultrasonic pulses onto several locations on the value document, and respectively an echo pulse arising by reflection of at least a portion of a respective ultrasonic pulse at the value document;
    receiving the echo pulses and forming echo values corresponding to said echo pulses, and
    establishing from the echo values at least a characteristic value as to a wrinkledness of the value document;
    wherein the ultrasonic pulses are emitted at a first side of the value document and the echo pulses are received at a second side opposing the first side of the value document.

2. The method according to claim 1, in which upon establishing the characteristic value for a distribution of the echo values, a value is established which is a measure for a position of an asymmetric distribution.

3. The method according to claim 2, in which a p quantile for a numeral p with 0.4<p<0.6, is employed as a measure for the position of an asymmetric distribution.

4. The method according to claim 1, in which upon establishing the characteristic value for a distribution of the echo values, a value is established which is a measure for an asymmetry of a distribution of the echo values captured for the value document.

5. The method according to claim 4, in which as a measure for the asymmetry, a difference between a mean value and a median of the echo values or the distribution is employed.

6. The method according to claim 5, in which a skewness of the distribution or the third central moment of the distribution is employed as a measure for the asymmetry.

7. The method according to claim 1, in which respectively a direct portion of the ultrasonic pulses which is received without reflection at the value document while forming a direct value, and
    before or upon the establishing of the characteristic value, the echo values for a respective echo pulse are corrected while employing the direct value for the direct portion of a same ultrasonic pulse by which the echo pulse was formed
    and/or the direct values for establishing another property of the value document are employed.

8. The method according to claim 7, in which the direct portion of a respective ultrasonic pulse and the echo pulse of the same ultrasonic pulse are received by means of the same ultrasonic receiving element.

9. An apparatus for examining a value document transported along a transport path, having
    a transmitting device which has at least one ultrasonic transmitting element and is devised for emitting ultrasonic pulses to different locations on a value document in the transport path,
    a receiving device which has at least one ultrasonic receiving element and is devised for receiving echo pulses which have arisen from the ultrasonic pulses emitted by the transmitting device by reflection at the value document in the transport path, and for forming echo values, and
    an evaluation device which is configured to establish from the echo values a characteristic value for a wrinkledness of the value document;
    wherein the transmitting device is configured to emit the ultrasonic pulses at a first side of the value document and the receiving device is configured to receive the echo pulses at a second side opposing the first side of the value document.

10. The apparatus according to claim 9, in which the evaluation device is configured to establish, upon establishing the characteristic value for a distribution of the echo values, a value which is a measure for a position of an asymmetric distribution.

11. The method according to claim 10, in which the evaluation device is configured to employ a p quantile for a numeral p with 0.4<p<0.6, as a measure for the position of an asymmetric distribution.

12. The apparatus according to claim 9, in which the evaluation device is configured to establish, upon establishing the characteristic value, a value which is a measure for an asymmetry of a distribution of the echo values captured for the value document.

13. The apparatus according to claim 12, in which the evaluation device is configured to employ a difference between a mean value and a median of the echo values or the distribution as a measure for the asymmetry.

14. The apparatus according to claim 9, in which the evaluation device is configured to employ a skewness of the distribution as a measure for the asymmetry.

15. The apparatus according to claim 9, in which the transmitting device and the receiving device are arranged on the same side of the transport path, and an ultrasonic path between the ultrasonic transmitting element and the ultrasonic receiving element, along which one ultrasonic pulse emitted by the ultrasonic transmitting element travels under reflection on a wrinkle-free value document in the transport path to the ultrasonic receiving element, has two portions inclined against a transport direction.

16. The apparatus according to claim 9, in which the transmitting device and the receiving device are arranged on mutually opposing sides of the transport path, and an ultrasonic path formed by the respective ultrasonic transmitting element and ultrasonic receiving element crosses the transport path and preferably runs at least approximately orthogonally to the transport path.

17. The apparatus according to claim 16, in which the receiving device is further configured such that respectively a direct portion of the ultrasonic pulses which is received without reflection at the value document while forming a direct value for the direct portion, and the evaluation device is further configured to correct, before or upon the establishing of the characteristic value, the echo values for a respective echo pulse while employing the direct value for the direct portion of the same ultrasonic pulse by which the echo pulse was formed, and/or to employ the direct values for establishing another property of the value document.

18. The apparatus according to claim 17, which is configured such that the same ultrasonic receiving elements receive direct portions as well as echo pulses.

19. An apparatus for processing value documents having
a feeding device for receiving value documents to be processed,
an output device for outputting or receiving the processed value documents,
a transport device for transporting the value documents from the feeding device along a transport path to the output device and
at least one apparatus according to claim 9 arranged in the region of a portion of the transport path for examining the value documents which are transported along the transport path.

* * * * *